United States Patent
Hung et al.

(10) Patent No.: US 12,362,557 B2
(45) Date of Patent: Jul. 15, 2025

(54) SELF-BIASING ESD POWER CLAMP

(71) Applicant: Taiwan Semiconductor Manufacturing Company, Ltd., Hsinchu (TW)

(72) Inventors: Tao Yi Hung, Hsinchu (TW); Jam-Wem Lee, Hsinchu (TW); Kuo-Ji Chen, Hsinchu (TW); Wun-Jie Lin, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 193 days.

(21) Appl. No.: 18/193,684

(22) Filed: Mar. 31, 2023

(65) Prior Publication Data

US 2024/0332958 A1    Oct. 3, 2024

(51) Int. Cl.
 *H02H 9/04* (2006.01)
 *H02H 1/00* (2006.01)
(52) U.S. Cl.
 CPC .......... *H02H 9/046* (2013.01); *H02H 1/0007* (2013.01)

(58) Field of Classification Search
 CPC ............................ H02H 9/046; H02H 1/0007
 See application file for complete search history.

(56) References Cited

U.S. PATENT DOCUMENTS

| | | | |
|---|---|---|---|
| 2006/0152868 A1* | 7/2006 | Ker | H01L 29/732 257/E29.183 |
| 2017/0346277 A1* | 11/2017 | Su | H10D 89/819 |
| 2018/0351352 A1* | 12/2018 | Chen | H01L 27/0922 |

* cited by examiner

*Primary Examiner* — Scott Bauer
(74) *Attorney, Agent, or Firm* — Jones Day

(57) ABSTRACT

Systems and methods are provided for a self-biasing electrostatic discharge (ESD) power clamp. The ESD power clamp comprises an ESD detection circuit coupled to a positive supply voltage node and a ground voltage node. The ESD detection circuit includes a first node having a first voltage level during a standby mode and a second voltage level during an ESD mode. The ESD power clamp further comprises a discharge circuit coupled to the ESD detection circuit that includes a plurality of discharge elements a self-biasing node having a third voltage level during the standby mode. The third voltage level provides a voltage drop across at least one of the discharge elements that is less than the first voltage level. The discharge circuit provides a high-impedance path during the standby mode and a low-impedance path during the ESD mode.

20 Claims, 6 Drawing Sheets

SELF-BIASING ESD POWER CLAMP

FIELD

The present disclosure relates to protective electrical circuits, and in particular to electro-static discharge (ESD) clamp circuits.

BACKGROUND

An electro-static discharge (ESD) clamp circuit is used in an ESD protection network. ESD clamp circuits are used to prevent circuit failure by bypassing ESD current through a low resistance path during ESD events such as a sudden surge in voltage. Conventional ESD clamp circuits employ large and costly components in high-voltage applications to decrease a voltage drop across other components within the ESD clamp circuit. These large and costly components can decrease profits and can occupy area within the ESD clamp circuit that could be omitted or better utilized with other components or devices.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

As noted above, ESD clamp circuits are used to prevent circuit failure of an electrical device by providing a low-impedance path for ESD current during ESD events. ESD clamp circuits in high voltage applications may utilize a voltage divider. A voltage divider may be utilized to provide a lower voltage drop across components (e.g., transistors) within the ESD clamp circuit. A lower voltage drop may be helpful to ensure reliability of the components. When constructed with resistors, a voltage divider can account for a large proportion (e.g., 50%) of the area of a conventional ESD clamp circuit. This is disadvantageous in circuit applications because the area occupied by the voltage divider could be eliminated or better utilized with other components. Systems and methods as provided herein may provide ESD clamp circuits that occupy less area.

In embodiments, it may be desirable for an ESD clamp circuit in high voltage applications to provide a voltage drop that is lower than a supply voltage across components (e.g., transistors) within a discharge path by systems and methods other than voltage dividers. Embodiments disclosed herein involve providing a lower voltage drop across discharge elements without a conventional voltage divider that includes resistors.

Figure 1:
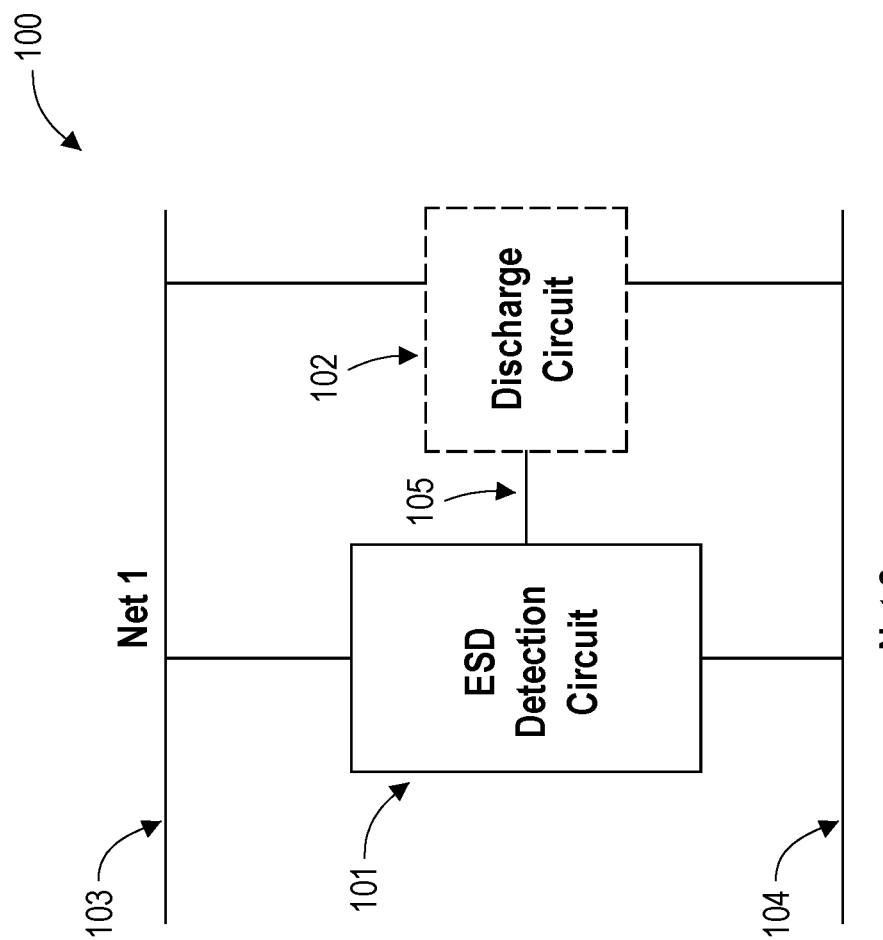
FIG. 1 depicts a block diagram of a self-biasing ESD power clamp, in accordance with an embodiment.

FIG. 1 depicts a block diagram of a self-biasing ESD power clamp, in accordance with an embodiment. The self-biasing ESD power clamp 100 may be coupled to an electrical device (not shown) to protect the device from circuit failures during ESD events, as described further below. The connected electrical device may be a separate component from the self-biasing ESD power clamp 100, or the ESD power clamp 100 may be a protective component within a larger circuit. In the example embodiment depicted in FIG. 1, the self-biasing ESD power clamp 100 includes an ESD detection circuit 101 and a discharge circuit 102 coupled to the ESD detection circuit 101 through a first node 105. The ESD detection circuit 101 and the discharge circuit 102 are each coupled to a positive supply voltage node 103 and a ground voltage node 104. The ground voltage node 104 may have a voltage level of, for example, 0 V during normal operations. The positive supply voltage node 103 may have a voltage level of, for example, 1.2 V during normal operations.

The ESD detection circuit 101 can operate in a standby mode during normal operations. During the standby mode, the positive supply voltage node 103 may contain a positive supply voltage level VDD. Based on this voltage (e.g., VDD) at the positive supply voltage node 103 during the standby mode, the first node 105 has a first voltage level (e.g., also positive supply voltage VDD). This first voltage level at the first node 105 causes the discharge circuit 102 to have high impedance or high resistance. During this standby mode, the connected discharge circuit 102 thus consumes low or zero current from the electrical device.

The ESD detection circuit 101 can also operate in an ESD mode during an ESD event. An ESD event may occur when the electrical device experiences a sudden change (e.g., increase) in the voltage level at the positive supply voltage node 103. An ESD event may be caused, for example, during a lightning strike, when an electrical short occurs between two electrical components within the electrical device, or when an object with a different electrical charge is brought into contact with the electrical device. For example, the positive supply voltage node 103 may have a voltage level $V_{HIGH}$ during the ESD mode. The ESD detection circuit 101 can detect this change in voltage at the positive supply voltage node 103. Based on this change in voltage, the first node 105 has a second voltage level (e.g., a low voltage $V_{LOW}$). This second voltage level at the first node 105 causes the discharge circuit 102 to have a low impedance or low resistance path. This low impedance or low resistance path in the discharge circuit 102 can provide a path for excess current during the ESD event and thus protect the electrical device from failure due to excessive current flow.

Figure 2:
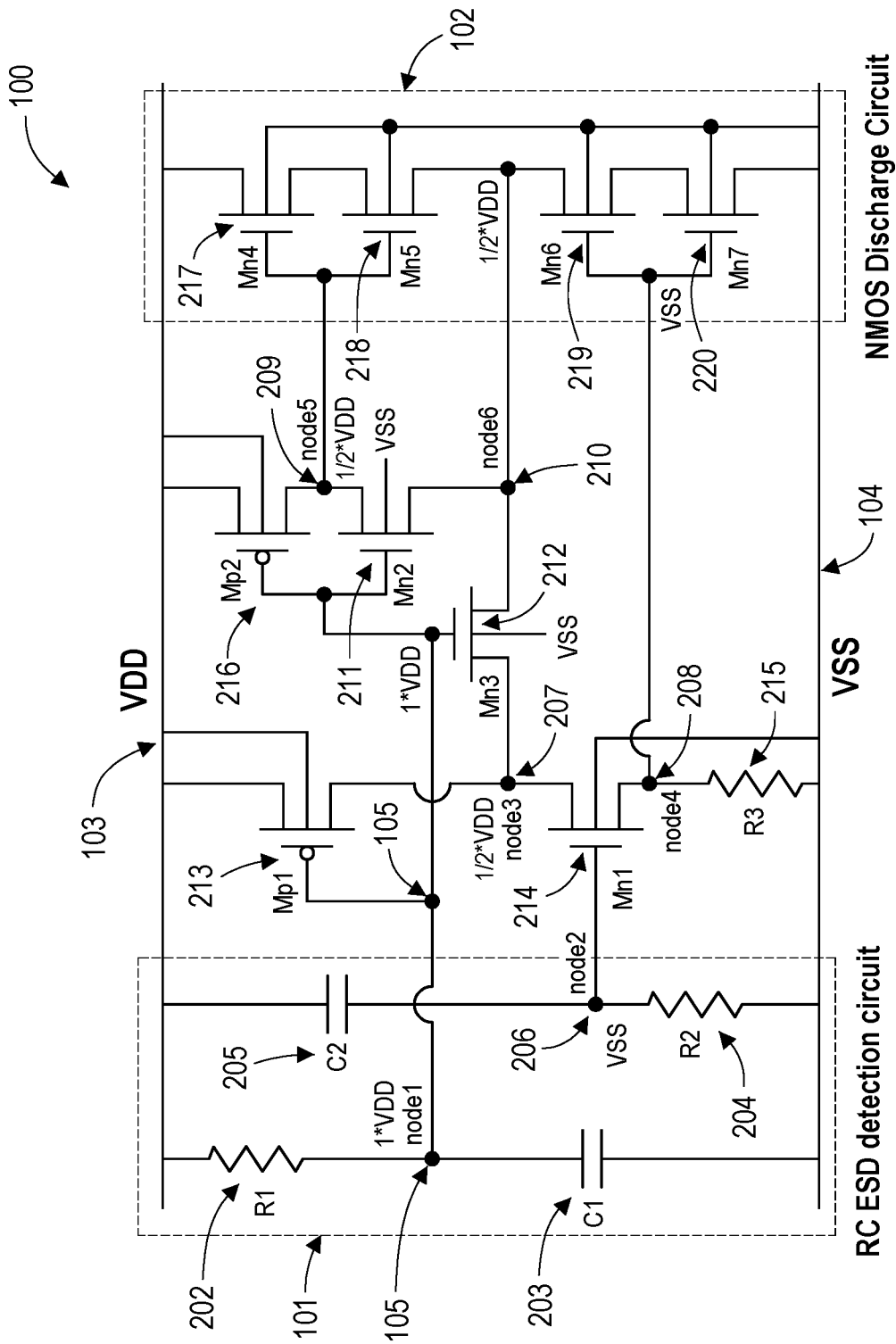
FIG. 2 depicts a circuit diagram of a self-biasing ESD power clamp with an NMOS discharge circuit during a standby mode, in accordance with an embodiment.

FIG. 2 depicts a circuit diagram of a self-biasing ESD power clamp with an NMOS discharge circuit during a standby mode, in accordance with an embodiment. In the example embodiment shown in FIG. 2, the self-biasing ESD power clamp 100 includes a plurality of transistors. However, in other example embodiments, other circuit components may be used. Furthermore, metal-oxide-semiconductor field-effect transistors (MOSFETs) are depicted in the example embodiment of FIG. 2. However, other types or kinds of transistors may be utilized in other example embodiments. The various discharge elements (e.g., transistors) utilized in the self-biasing ESD power clamp 100 shown in FIG. 2 may be the same size as one another, or may be different sizes.

The ESD detection circuit 101 of the self-biasing ESD power clamp 100 includes a first resistor R1 202, a first capacitor C1 203, a second resistor R2 204, and a second capacitor C2 205. The first resistor R1 202 and first capacitor C1 203 are connected in series. The first resistor R1 202 is coupled to the positive supply voltage node 103, and the first capacitor C1 203 is coupled to the ground voltage node 104. A first node 105 is positioned between the first resistor R1 202 and the first capacitor C1 203. The second resistor R2 204 and the second capacitor C2 205 are also connected in series. The second resistor R2 204 is coupled to the ground voltage node 104 and the second capacitor C2 205 is coupled to the positive supply voltage node 103. A second node 206 is positioned between the second resistor R2 204 and the second capacitor C2 205.

The first node 105 is coupled to the gate terminals of a first p-channel MOSFET 213 and a second p-channel MOSFET 216. The drain and substrate terminals of the first and second p-channel MOSFETs (213, 216) are coupled to the positive supply voltage node 103. The source terminal of the first p-channel MOSFET 213 is coupled to a third node, and the source terminal of the second p-channel MOSFET 216 is coupled to a fifth node 209. The fifth node 209 is coupled to the gate terminals of a fourth n-channel MOSFET 217 and a fifth n-channel MOSFET 218. The first node 105 is also coupled to the gate terminals of a second n-channel MOSFET 211 and a third n-channel MOSFET 212. The source terminals of the second and third n-channel MOSFETs (211, 212) are coupled to a sixth node. The substrate terminals of the second and third n-channel MOSFETs (211, 212) are coupled to the ground voltage node 104. The drain terminal of the second n-channel MOSFET 211 is coupled to the fifth node 209, and the drain terminal of the third n-channel MOSFET 212 is coupled to the third node 207.

The second node 206 is coupled to the gate terminal of a first n-channel MOSFET 214. The source terminal of the first n-channel MOSFET 214 is coupled to a fourth node 208. The fourth node 208 is coupled to a third resistor 215. The third resistor 215 is connected to the ground voltage node 104. The substrate terminal of the first n-channel MOSFET 214 is coupled to the ground voltage node 104. The drain terminal of the first n-channel MOSFET 214 is coupled to the third node 207. The fourth node 208 is coupled to gate terminals of a sixth n-channel MOSFET 219 and a seventh n-channel MOSFET 220.

The discharge circuit 102 comprises the fourth n-channel MOSFET 217, the fifth n-channel MOSFET 218, the sixth n-channel MOSFET 219, and the seventh n-channel MOSFET 220. The MOSFETs of the discharge circuit may be physically large (e.g., larger than an average transistor) to accommodate the relatively large discharge current occurring in high-voltage applications. The substrate terminals of the fourth, fifth, sixth, and seventh n-channel MOSFETs (217, 218, 219, 220) are coupled to the ground voltage node 104. The source terminal of the seventh n-channel MOSFET 220 is also coupled to the ground voltage node 104. The drain terminal of the seventh n-channel MOSFET 220 is coupled to the source terminal of the sixth n-channel MOSFET 219. The drain terminal of the sixth n-channel MOSFET 219 is coupled to the sixth node 210 and the source terminal of the fifth n-channel MOSFET 218. The drain terminal of the fifth n-channel MOSFET 218 is coupled to the source terminal of the fourth n-channel MOSFET 217. The drain terminal of the fourth n-channel MOSFET 217 is coupled to the positive supply voltage node 103.

The positive supply voltage node 103 has a positive supply voltage level VDD. During the standby mode shown in FIG. 2, the sixth node 210 has a voltage level that is less than the positive supply voltage level VDD, as described further below. An ESD event is not occurring in this standby mode and thus very little or zero current flows through the first resistor R1 202 or second resistor R2 204 and a significant voltage drop does not appear across the first or second resistors (R1 202, R2 204). In this steady-state of the ESD mode, a voltage drop (e.g., a voltage drop equal to VDD) appears across the first capacitor C1 203 and the second capacitor C2 205. A first voltage level (e.g., VDD) thus appears on the first node 105, and a ground voltage (e.g., VSS) appears on a second node 206.

Because the first node 105 is coupled to the gate terminals of the second n-channel MOSFET 211 and the third n-channel MOSFET 212, the first voltage level VDD appearing on the first node 105 causes the second and third n-channel MOSFETs (211, 212) to turn on. This causes the voltage appearing at the first node 105, VDD, to be distributed between the sixth node 210 (e.g., the source terminals of the second and third n-channel MOSFETs (211, 212)) and the third and fifth nodes (207, 209) (e.g., the drain terminals of the third and second n-channel MOSFETs (212, 211), respectively). In the example depicted in FIG. 2, the third n-channel MOSFET 212 and the second n-channel MOSFET 211 are substantially the same size.

Therefore, a voltage level approximately equal to 0.5× VDD appears at the sixth node 210, and a voltage level approximately equal to 0.5×VDD also appears at the fifth node 209 and the third node 207. Furthermore, the voltage level VDD at the first node 105 may be insufficient (e.g., too high) to turn on the first and second p-channel MOSFETs (213, 216).

In the standby mode, very little or no current passes through the third resistor 215. Thus, the voltage at the fourth node 208 will be approximately the ground voltage VSS 104. In the example embodiment of FIG. 2, the n-channel MOSFETs (217, 218, 219, 220) of the discharge circuit 102 have a threshold voltage VTH that is greater than 0.5×VDD. Thus, the voltage levels appearing at the fourth node 208 and the fifth node 209 may not be sufficient to turn on these MOSFETs (217, 218, 219, 220) within the discharge circuit 102. Accordingly, electrical current is unable to flow between the source and drain terminals of these transistors (217, 218, 219, 220) in the standby mode and the discharge circuit 102 contains a high resistance or high impedance path.

Figure 3:
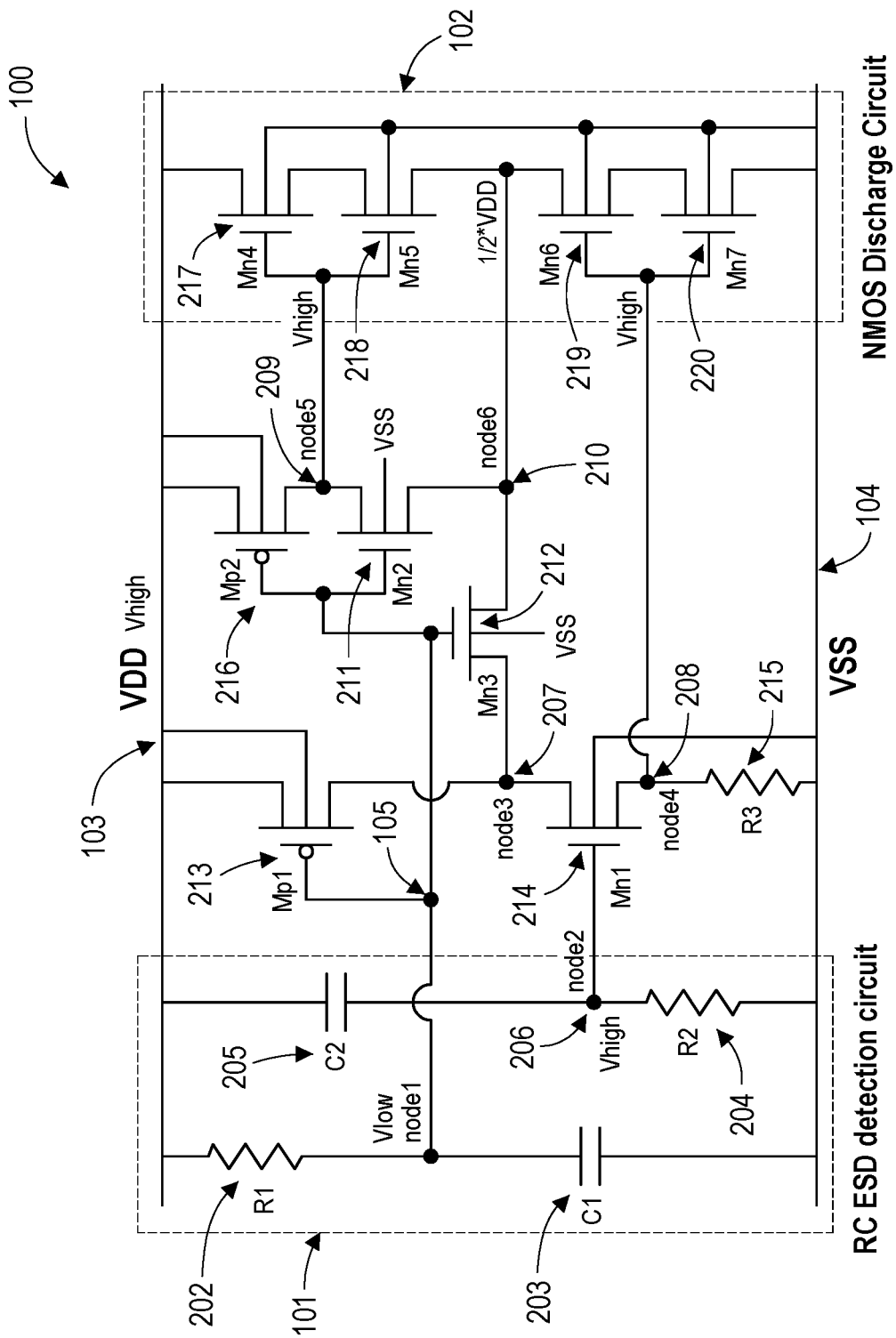
FIG. 3 depicts a circuit diagram of a self-biasing ESD power clamp with an NMOS discharge circuit during an ESD event, in accordance with an embodiment.

FIG. 3 depicts a circuit diagram of a self-biasing ESD power clamp with an NMOS discharge circuit during an ESD event, in accordance with an embodiment. In the example embodiment depicted in FIG. 3, the ESD event (e.g., a lightning strike, an electrical short between two electrical components within the electrical device, or an object having a different electrical charge being brought into contact with the electrical device) causes the positive supply voltage node 103 to realize a sudden change (e.g., increase) in voltage. In the example of FIG. 3, the voltage at the positive supply voltage node 103 during the ESD event is $V_{HIGH}$. This sudden change in voltage causes a current to flow through the first resistor R1 202 and first capacitor C1 203, from the positive supply voltage node 103 to the ground voltage node 104. This sudden current causes the impedance of the first capacitor C1 203 to change (e.g., decrease). In the example depicted in FIG. 3, the impedance of the first capacitor C1 203 is negligible during the ESD event and the first node 105 couples to the voltage level of the ground voltage node 104. In the example of FIG. 3, this voltage level is $V_{LOW}$.

This sudden change in voltage and current also causes a voltage drop across the first resistor R1 202 to change (e.g., increase). This voltage level $V_{LOW}$ appearing at the first node 105 causes the first p-channel MOSFET 213 and the second p-channel MOSFET 216 to turn on. Because the drain terminals of the first p-channel MOSFET 213 and the second p-channel MOSFET 213 are coupled to the positive supply voltage node 103, this will cause the voltage appearing at the positive supply voltage node 103 (e.g., $V_{HIGH}$) to appear at the fifth node 209 and the third node 207.

During the sudden change in voltage at the positive supply voltage node 103, a current also appears across the second resistor R2 204 and second capacitor C2 205, and the impedance of the second capacitor C2 changes (e.g., decreases). In this way, the ESD detection circuit 101 can act as a low-pass filter during the ESD event. In the example embodiment of FIG. 3, the impedance of the second capacitor C2 205 during the ESD event is negligible and the second node 206 couples to the positive supply voltage node 103. Thus, the voltage level appearing at the positive supply voltage node 103 $V_{HIGH}$ appears at the second node 206. This voltage level $V_{HIGH}$ at the second node 206 causes the first n-channel MOSFET 214 to turn on. This causes the voltage appearing at the third node 207 (e.g., $V_{HIGH}$) to appear at the fourth node 208. Because the fourth node 208 is coupled to the gate terminals of the sixth n-channel MOSFET 219 and the seventh n-channel MOSFET 220, the sixth and seventh n-channel MOSFETs (219, 220) will be turned on due to the change (e.g., increase) in voltage level at the fourth node 208.

As discussed above, the fifth node 209, which is coupled to the gate terminals of the fourth n-channel MOSFET 217 and the fifth n-channel MOSFET 218, is also coupled to the voltage of the positive supply voltage node 103, $V_{HIGH}$. Thus, the fourth and fifth n-channel MOSFETs (217, 218) are also turned on. This allows for a low-impedance path through the n-channel MOSFETs (217, 218, 219, 220) of the discharge circuit 102. The n-channel MOSFETs (217, 218, 219, 220) can thus protect the electrical device by providing a low-impedance path for excess current from the positive supply voltage node 103 to the ground voltage node 104 during an ESD event. In the absence of the self-biasing ESD power clamp 100, this excess current may flow through and damage components of the electrical device.

Figure 4:
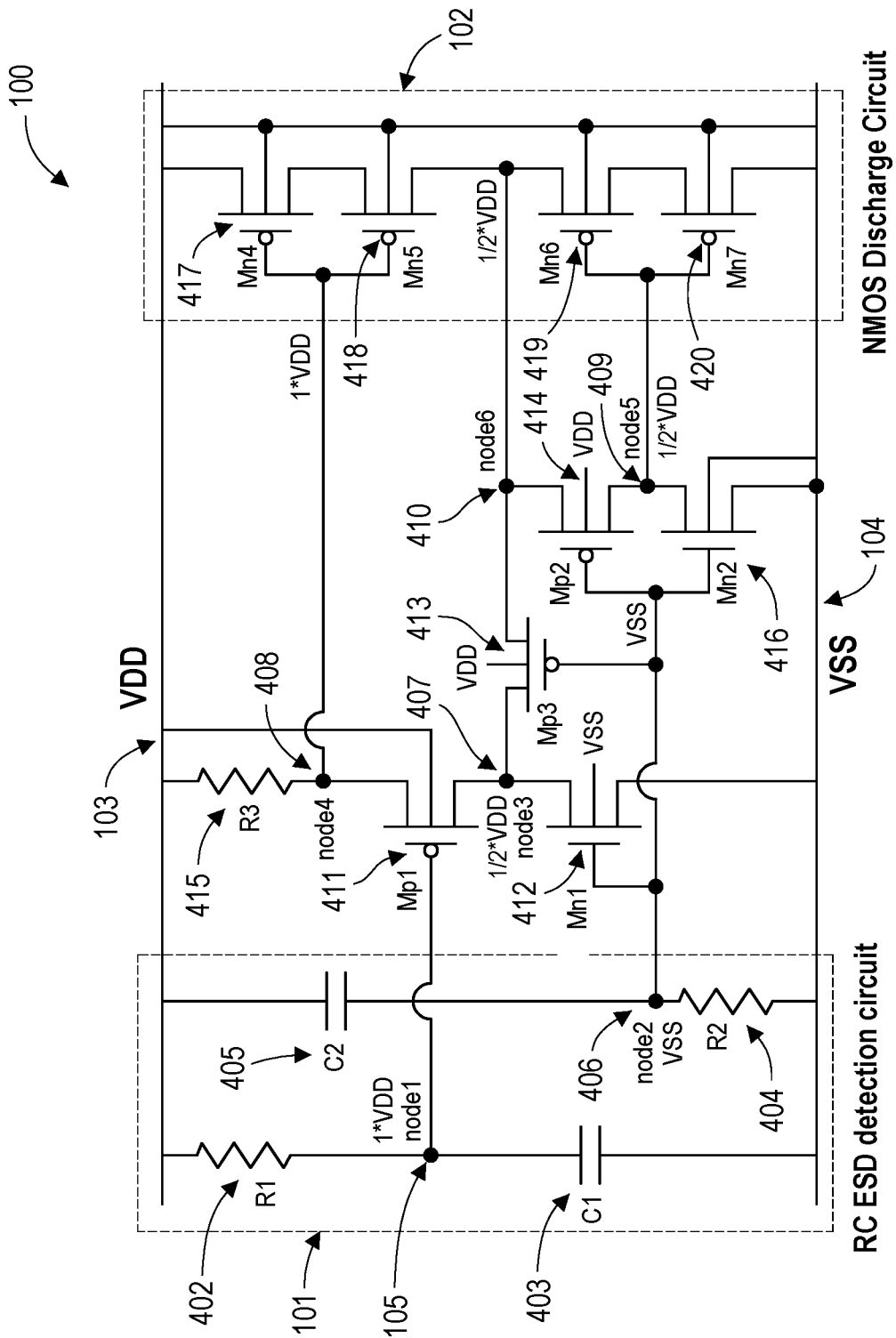
FIG. 4 depicts a circuit diagram of a self-biasing ESD power clamp with a PMOS discharge circuit during a standby mode, in accordance with an embodiment.

FIG. 4 depicts a circuit diagram of a self-biasing ESD power clamp with a PMOS discharge circuit during a standby mode, in accordance with an embodiment. In the example embodiment shown in FIG. 4, the self-biasing ESD power clamp 100 includes a plurality of transistors. However, in other example embodiments, other circuit components may be used. Furthermore, metal-oxide-semiconductor field-effect transistors (MOSFETs) are depicted in the example embodiment of FIG. 4. However, other types or kinds of transistors may be utilized in other example embodiments. The various discharge elements (e.g., transistors) utilized in the self-biasing ESD power clamp 100 shown in FIG. 4 may be the same size as one another, or may be different sizes.

The ESD detection circuit 101 includes a first resistor R1 402, a first capacitor C1 403, a second resistor R2 404, and a second capacitor C2 405. The first resistor R1 402 and the first capacitor C1 403 are connected in series. The first resistor R1 is coupled to the positive supply voltage node 103 and the first capacitor C1 403 is coupled to the ground voltage node 104. A first node 105 is positioned between the first resistor R1 402 and the first capacitor C1 403. The second resistor R2 404 and the second capacitor C2 405 are also connected in series. The second capacitor C2 405 is coupled to the positive supply voltage node 103 and the second resistor R2 404 is coupled to the ground voltage node 104. A second node 406 is positioned between the second resistor R2 404 and the second capacitor C2 405.

The first node 105 is coupled to the gate terminal of a first p-channel MOSFET 411. The drain terminal of the first p-channel MOSFET 411 is coupled to a fourth node 408. A first end of a third resistor R3 415 is coupled to the fourth node 408, and a second end of the third resistor R3 415 is coupled to the positive supply voltage node 103. The substrate terminal of the first p-channel MOSFET 411 is coupled to the positive supply voltage node 103. The source terminal of the first p-channel MOSFET 411 is coupled to a third node 407. The fourth node 408 is coupled to the gate terminals of a fourth p-channel MOSFET 417 and a fifth p-channel MOSFET 418.

The second node 406 is coupled to the gate terminal of a first n-channel MOSFET 412 and a second n-channel MOSFET 416. The second node 406 is also coupled to the gate terminals of a second p-channel MOSFET 414 and a third p-channel MOSFET 413. The source and substrate terminals of the first n-channel MOSFET 412 are coupled to the ground voltage node 104. The drain terminal of the first n-channel MOSFET 412 is coupled to the third node 407. The source and substrate terminals of the second n-channel MOSFET 416 are coupled to the ground voltage node 104.

The drain terminal of the second n-channel MOSFET 416 is coupled to a fifth node 409. The source terminal of the second p-channel MOSFET 414 is coupled to the fifth node 409. The fifth node is also coupled to the gate terminals of a sixth p-channel MOSFET 419 and a seventh p-channel MOSFET 420.

The substrate terminal of the second p-channel MOSFET 414 is coupled to the positive supply voltage node 103, and the drain terminal of the second p-channel MOSFET 414 is coupled to a sixth node 410. The substrate terminal of the third p-channel MOSFET 413 is coupled to the positive supply voltage node 103. The drain terminal of the third p-channel MOSFET 413 is coupled to the sixth node 410, and the source terminal of the third p-channel MOSFET 413 is coupled to the third node 407.

As discussed above, the fourth node 408 is coupled to the gate terminals of the fourth and fifth p-channel MOSFETs (417, 418), and the fifth node 409 is coupled to the gate terminals of the sixth and seventh p-channel MOSFETs (419, 420). The discharge circuit 102 in the example embodiment of FIG. 5 comprises the fourth, fifth, sixth, and seventh p-channel MOSFETs (417, 418, 419, 420). The substrate terminals of each of the fourth, fifth, sixth, and seventh p-channel MOSFETs (417, 418, 419, 420) are coupled to the positive supply voltage node 103. The drain terminal of the fourth p-channel MOSFET 417 is coupled to the positive supply voltage node 103. The source terminal of the fourth p-channel MOSFET 417 is coupled to the drain terminal of the fifth p-channel MOSFET 418. The source terminal of the fifth p-channel MOSFET 418 is coupled to both the sixth node 410 and the drain terminal of the sixth p-channel MOSFET 419. The source terminal of the sixth p-channel MOSFET 419 is coupled to the drain terminal of the seventh p-channel MOSFET 420. The source terminal of the seventh p-channel MOSFET 420 is coupled to the ground voltage node 104.

During the standby mode in the example embodiment illustrated in FIG. 4, the positive supply voltage node 103 has a positive supply voltage level VDD. During the standby mode shown in FIG. 4, a sixth node 410 has a voltage level that is less than the positive supply voltage level VDD. An ESD event is not occurring in this standby mode and thus very little or zero current flows through the first resistor R1 402 or second resistor R2 404 and a significant voltage drop does not appear across the first or second resistors (R1 402, R2 404). In this steady-state of the ESD mode, a voltage drop (e.g., a voltage drop equal to VDD) appears across the first capacitor C1 403 and the second capacitor C2 405. The first voltage level (e.g., VDD) thus appears on the first node 105, and a ground voltage (e.g., VSS) appears on a second node 406.

Because the second node 406 is coupled to the gate terminals of the second p-channel MOSFET 414 and the third p-channel MOSFET 413, the ground voltage appearing on the second node 406 causes the second and third p-channel MOSFETs (414, 413) to turn on. Because the substrate terminals of the second and third p-channel MOSFETs (414, 413) are each coupled to the positive supply voltage node, the positive supply voltage level is distributed between the sixth node (e.g., the drain terminals of the second and third p-channel MOSFETs (414, 413)) and the third and fifth nodes (407, 409) (e.g., the source terminals of the third and second p-channel MOSFETs (413, 414), respectively). In the example embodiment of FIG. 4, the second p-channel MOSFET 414 and the third p-channel MOSFET 413 are the same size. Thus, a voltage level approximately equal to 0.5×VDD appears on the sixth node 410, and a voltage level approximately equal to 0.5×VDD also appears at the third node 407 and the fifth node 409.

In the standby mode, very little or no current will pass through the third resistor 415. Thus, the voltage at the fourth node 408 will be approximately the voltage at the positive supply voltage node 103, VDD. In the example embodiment of FIG. 4, the p-channel MOSFETs (417, 418, 419, 420) of the discharge circuit 102 turn on when a voltage level below a threshold voltage VTH is applied to their gate terminals. This threshold voltage level may be below 0.5×VDD. Thus, the voltage levels appearing at the fourth node 408 and the fifth node 409 may not be sufficient to turn on these transistors (417, 418, 419, 420) within the discharge circuit 102. Accordingly, electrical current is unable to flow between the source and drain terminals of these transistors (417, 418, 419, 420) in the standby mode and the discharge circuit 102 contains a high resistance or high impedance path.

Figure 5:
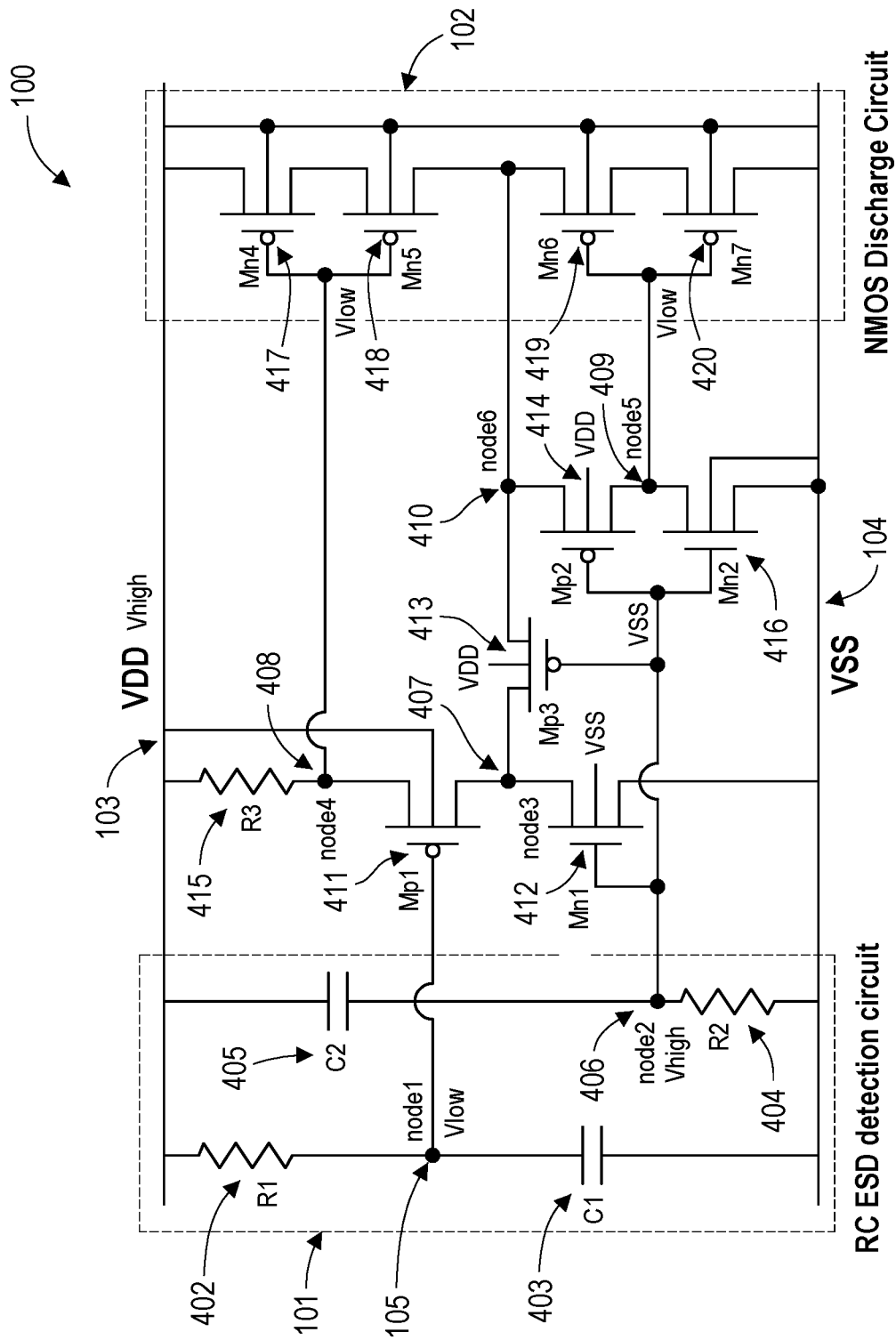
FIG. 5 depicts a circuit diagram of a self-biasing ESD power clamp with a PMOS discharge circuit during an ESD event, in accordance with an embodiment.

FIG. 5 depicts a circuit diagram of a self-biasing ESD power clamp with a PMOS discharge circuit during an ESD event, in accordance with an embodiment. In the example embodiment depicted in FIG. 5, the ESD event (e.g., a lightning strike, an electrical short between two electrical components within the electrical device, or an object having a different electrical charge being brought into contact with the electrical device) causes the positive supply voltage node 103 to realize a sudden change (e.g., increase) in voltage. In the example of FIG. 5, the voltage at the positive supply voltage node 103 during the ESD event is $V_{HIGH}$. This sudden change in voltage causes a current to flow through the first resistor R1 402 and first capacitor C1 403, from the positive supply voltage node 103 to the ground voltage node 104. This sudden current causes a change (e.g., decrease) in the impedance of the first capacitor C1 403. In the example of FIG. 3, the impedance of the first capacitor C1 403 is negligible during the ESD event and the first node 105 couples to the ground voltage node 104. This voltage level may be $V_{LOW}$. This sudden change in current may also cause a change (e.g., decrease) in the voltage level appearing across the first capacitor C1 403 compared with the voltage level appearing across the first capacitor C1 403 during the standby mode.

During the ESD event, a current may also flow across the second resistor R2 and the second capacitor C2 405. This sudden current causes the impedance of the second capacitor C2 405 to change (e.g., decrease). In the example depicted in FIG. 5, the impedance of the second capacitor C2 405 is negligible and the second node 406 couples to the positive supply voltage node 103. Thus, the ESD detection circuit 101 may act as a low-pass filter during the ESD event. As discussed above, this voltage appearing at the positive supply voltage node 103 during an ESD event is $V_{HIGH}$ in the example depicted in FIG. 5. The second node 406 is coupled to the gate terminal of the first n-channel MOSFET 412, and this voltage level $V_{HIGH}$ at the second node 406 causes the first n-channel MOSFET 412 to turn on. When the first n-channel MOSFET 412 turns on, the voltage appearing at the source terminal of the first n-channel MOSFET 412, $V_{LOW}$, appears at the drain terminal of the first n-channel MOSFET 412, which is coupled to the third node 407. Thus, the third node 407 has a voltage level of $V_{LOW}$.

As discussed above, the voltage level appearing at the first node 105 during the ESD event is $V_{LOW}$ in the example of FIG. 5. This voltage level $V_{LOW}$ is lower than the threshold voltage of the first p-channel MOSFET 411, and causes the first p-channel MOSFET 411 to turn on. The voltage level at the third node 407, $V_{LOW}$, then appears at the fourth node 408. A current may appear across the third resistor 415, and the third resistor 415 may thus also contribute to the voltage difference (e.g., drop) between the positive supply voltage node 103, $V_{HIGH}$, and the fourth node 408, $V_{LOW}$. The fourth node 408 is coupled to the gate terminals of the fourth p-channel MOSFET 417 and the fifth p-channel MOSFET 418. Because the voltage level $V_{LOW}$ is below the threshold voltage level of the fourth and fifth p-channel MOSFETs (417, 418), the fourth and fifth p-channel MOSFETs (417, 418) turn on during the ESD event.

As discussed above, the second node 406 is coupled to the gate terminal of the second n-channel MOSFET 416. The voltage level $V_{HIGH}$ appearing at the second node 406 causes the second n-channel MOSFET 416 to turn on, and the voltage level at the source terminal of the second n-channel MOSFET 416 appears at the drain terminal of the second n-channel MOSFET 416, which is coupled to the fifth node 409. In the example embodiment of FIG. 5, this voltage level that is coupled from the source terminal of the second n-channel MOSFET 416 to the fifth node 409 is $V_{LOW}$. The fifth node 409 is coupled to the gate terminals of the sixth and seventh p-channel MOSFETs (419, 420) and the voltage $V_{LOW}$ at the fifth node 409 causes the sixth and seventh p-channel MOSFETs (419, 420) to turn on.

As discussed above, the fourth and fifth p-channel MOSFETs (417, 418) are also turned on during the ESD event. This allows for a low-impedance path through the p-channel MOSFETs (417, 418, 419, 420) of the discharge circuit 102. The p-channel MOSFETs (417, 418, 419, 420) can thus protect the electrical device by providing a low-impedance path for excess current from the positive supply voltage node 103 to the ground voltage node 104 during an ESD event. In the absence of the self-biasing ESD power clamp 100, this excess current may flow through and damage components of the electrical device.

Figure 6:
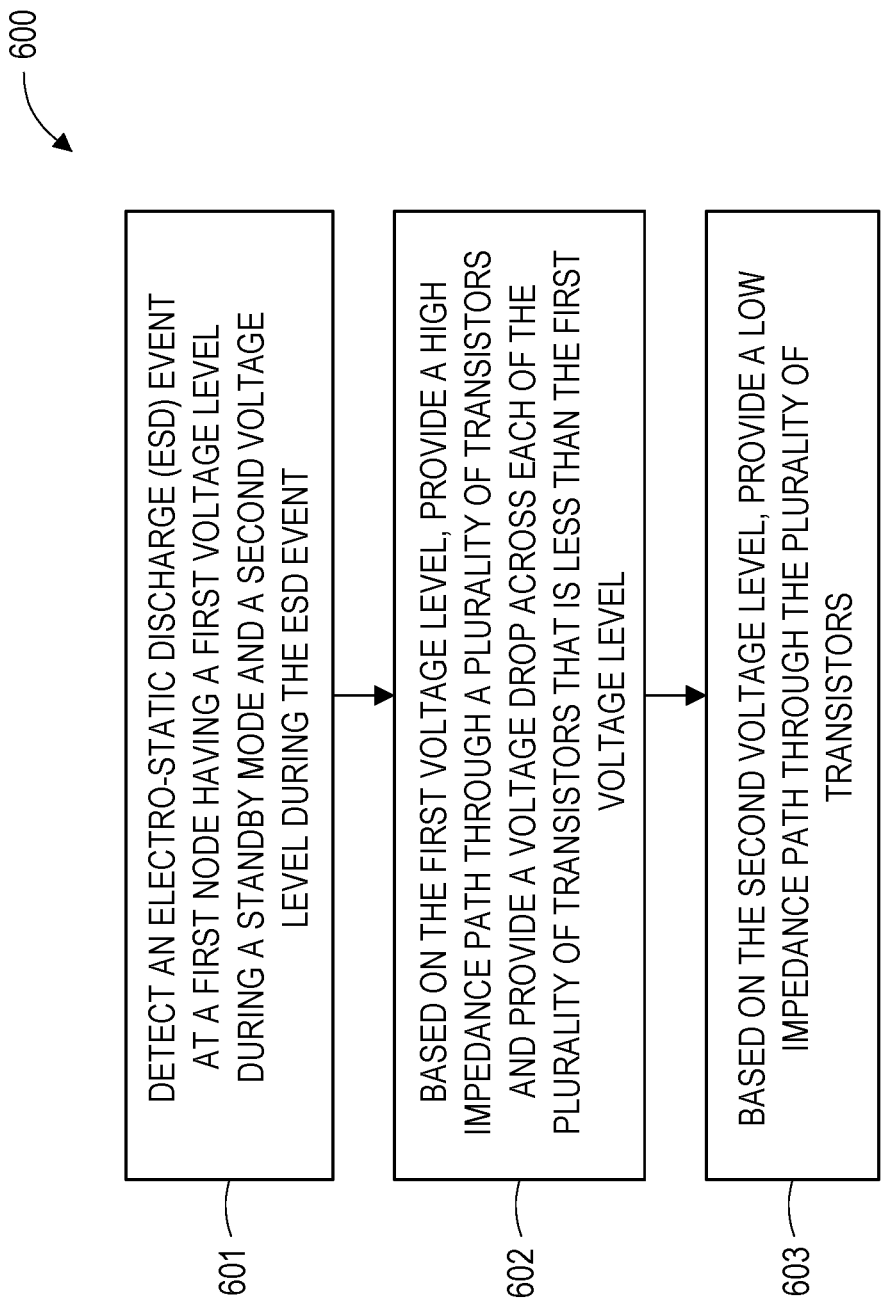
FIG. 6 depicts a method of discharging an electro-static discharge (ESD) current, in accordance with an embodiment.

FIG. 6 depicts a method of discharging an electro-static discharge (ESD) current, in accordance with an embodiment. In the example embodiment depicted in FIG. 6, the method 600 includes a first step 601 of detecting an ESD event at a first node having a first voltage level during a standby mode and a second voltage level during the ESD event. The method 600 further includes a second step 602 of, based on the first voltage level, providing a high impedance path through a plurality of transistors and providing a voltage drop across each of the plurality of transistors that is less than the first voltage level. The method 600 also includes a third step 603 of, based on the second voltage level, providing a low impedance path through the plurality of transistors. In some example embodiments, the method 600 may include additional or fewer steps. Furthermore, the method 600 may be performed in an order that differs from that disclosed in FIG. 6.

Systems and methods are described herein. In one example, an electro-static discharge (ESD) power clamp comprises an ESD detection circuit coupled to a positive supply voltage node and a ground voltage node. The ESD detection circuit includes a first node having a first voltage level during a standby mode and a second voltage level during an ESD mode. The ESD power clamp further comprises a discharge circuit coupled to the ESD detection circuit that includes a plurality of discharge elements a self-biasing node having a third voltage level during the standby mode. The third voltage level provides a voltage drop across at least one of the discharge elements that is less than the first voltage level. The discharge circuit provides a high-impedance path during the standby mode and a low-impedance path during the ESD mode.

In another example, an electro-static discharge (ESD) circuit includes a positive supply voltage node having a supply voltage level during a standby mode and an excess voltage level during an ESD mode. The discharge path includes a first end coupled to the positive supply voltage node and a second end coupled to a ground voltage node. The discharge path further includes a plurality of discharge elements and a self-biasing node having a voltage level that is less than the supply voltage during the standby mode. The self-biasing node provides a voltage drop across each of the plurality of discharge elements that is less than the supply voltage. Based on the supply voltage at the positive supply voltage node, the discharge path has a high impedance. Based on the excess voltage at the positive supply voltage node, the discharge path has a low impedance.

In another example, a method of discharging an electro-static discharge (ESD) current comprises detecting an ESD event at a first node. The first node has a first voltage level during a standby mode and a second voltage level during the ESD event. Based on the first voltage level, a high impedance path is provided through a plurality of transistors and a voltage drop is provided across each of the plurality of transistors. The voltage drop is less than the first voltage level. Based on the second voltage level, a low impedance path is provided through the plurality of transistors.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A self-biasing electro-static discharge (ESD) power clamp comprising:
   an ESD detection circuit coupled to a positive supply voltage node and a ground voltage node, the ESD detection circuit including a first node having a first voltage level during a standby mode and a second voltage level during an ESD mode;
   a discharge circuit coupled to the ESD detection circuit, the discharge circuit comprising a plurality of discharge elements and a self-biasing node having a third voltage level during the standby mode, the third voltage level providing a voltage drop across at least one of the discharge elements that is less than the first voltage level, the discharge circuit providing a high-impedance path during the standby mode and a low-impedance path during the ESD mode; and
   first and second transistors having gate terminals connected to the first node and a common source/drain terminals connected to the self-biasing node, wherein the first and second transistors are turned on during the standby mode.

2. The self-biasing ESD power clamp of claim 1, wherein the plurality of discharge elements are transistors.

3. The self-biasing ESD power clamp of claim 2, wherein the positive supply voltage node and the ground voltage node are coupled to an electronic device, wherein a positive supply voltage of the electronic device appears at the positive supply voltage node.

4. The self-biasing ESD power clamp of claim 2, wherein the third voltage level is below a threshold voltage of the transistors.

5. The self-biasing ESD power clamp of claim 4, wherein the third voltage level appears at a gate terminal of the transistors during the standby mode and a fourth voltage level appears at the gate terminal of the transistors during the ESD mode, the fourth voltage level above the threshold voltage of the transistors.

6. The self-biasing ESD power clamp of claim 1, wherein the ESD detection circuit further comprises a first resistor and first capacitor connected in series.

7. The self-biasing ESD power clamp of claim 6, wherein the first resistor is coupled to the positive supply voltage node and the first capacitor is coupled to the ground voltage node.

8. The self-biasing ESD power clamp of claim 7, wherein the ESD detection circuit further comprises a second resistor and a second capacitor connected in series.

9. The self-biasing ESD power clamp of claim 8, wherein the second resistor is coupled to the ground voltage node and the second capacitor is coupled to the positive supply voltage node.

10. The self-biasing ESD power clamp of claim 1, wherein the first voltage level is substantially equal to a voltage level appearing on the positive supply voltage node during the standby mode.

11. The self-biasing ESD power clamp of claim 10, wherein the third voltage level is substantially equal to one half of the voltage level appearing on the positive supply voltage node during the standby mode.

12. An electro-static discharge (ESD) circuit comprising:
a positive supply voltage node having a supply voltage level during a standby mode and an excess voltage level during an ESD mode;
a discharge path including a first end coupled to the positive supply voltage node and a second end coupled to a ground voltage node, the discharge path further including a plurality of discharge elements and a self-biasing node having a voltage level that is less than the supply voltage during the standby mode, the self-biasing node providing a voltage drop across each of the plurality of discharge elements that is less than the supply voltage; and
first and second transistors having gate terminals connected to a first node and a common source/drain terminal connected to the self-biasing node, wherein the first node has the supply voltage level during the standby mode, and the first and second transistors are turned on during the standby mode;
wherein based on the supply voltage at the positive supply voltage node, the discharge path has a high impedance during the standby mode;
wherein based on the excess voltage at the positive supply voltage node, the discharge path has a low impedance relative to the high impedance during the ESD mode.

13. The ESD circuit of claim 12, wherein the discharge elements are transistors.

14. The ESD circuit of claim 13, wherein a threshold voltage of the transistors is between the voltage of the self-biasing node during the standby mode and a voltage of the self-biasing node during the ESD mode.

15. The ESD circuit of claim 13, wherein the self-biasing node is coupled to the first node of an ESD detection circuit having a first voltage level during the standby mode and a second voltage level during the ESD mode.

16. The ESD circuit of claim 15, wherein the first node of the ESD detection circuit is coupled to the positive supply voltage node, the ground voltage node, and a capacitor, a current flowing through the capacitor during the ESD mode.

17. A method of discharging an electro-static discharge (ESD) current comprising:
detecting an ESD event at a first node, the first node having a first voltage level during a standby mode and a second voltage level during the ESD event;
based on the first voltage level, providing a high impedance path through a plurality of transistors and providing a voltage drop across each of the plurality of transistors that is less than the first voltage level by turning on first and second transistors of the plurality of transistors, wherein the first and second transistors have gate terminals connected to the first node and a common source/drain terminal connected to a self-biasing node of the plurality of transistors, and the self-biasing node has a third voltage level that is less than the first voltage level during the standby mode; and
based on the second voltage level, providing a low impedance path through the plurality of transistors.

18. The method of claim 17, wherein providing the high impedance path comprises coupling the third voltage level to a gate terminal of the plurality of transistors, the third voltage level between the first voltage level and the second voltage level.

19. The method of claim 18, wherein the first voltage level is higher than a rated voltage level of each of the plurality of transistors.

20. The method of claim 18, wherein the first node is positioned within a low-pass filter, a current flowing through the low-pass filter during the ESD event.

* * * * *